Figure 1:
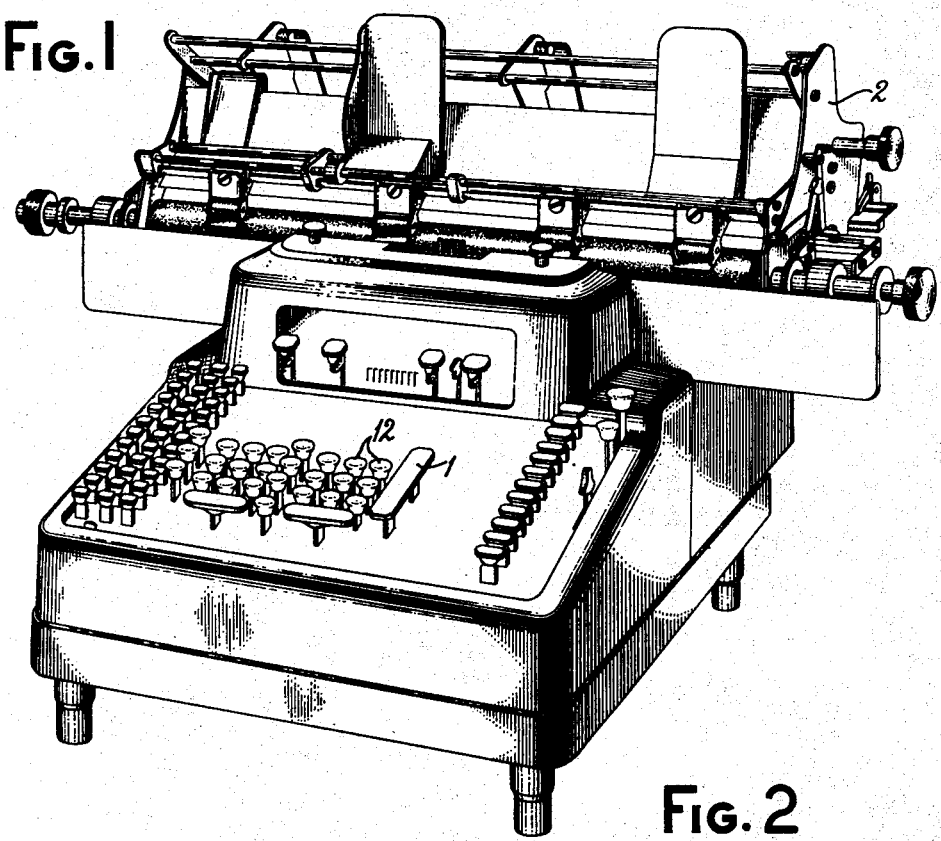

Feb. 3, 1942.  W. A. ANDERSON  2,272,079

PRINTING MECHANISM FOR ACCOUNTING MACHINES

Filed Dec. 30, 1938  5 Sheets-Sheet 1

Inventor
WALTER A. ANDERSON
*L. G. Julihn*
Attorney

Feb. 3, 1942.  W. A. ANDERSON  2,272,079
PRINTING MECHANISM FOR ACCOUNTING MACHINES
Filed Dec. 30, 1938  5 Sheets-Sheet 2
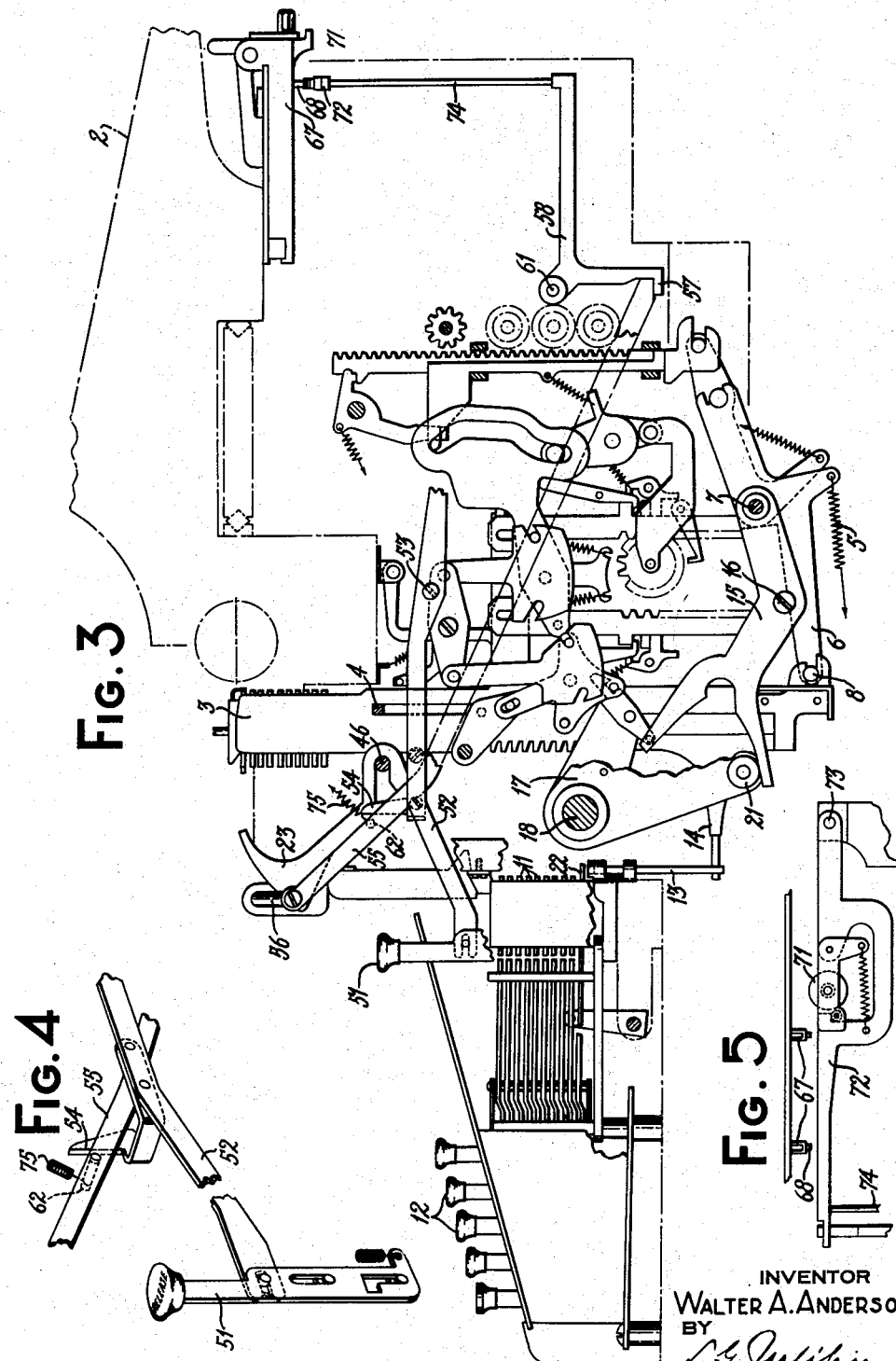
INVENTOR
WALTER A. ANDERSON
BY
ATTORNEY Feb. 3, 1942. W. A. ANDERSON 2,272,079
PRINTING MECHANISM FOR ACCOUNTING MACHINES
Filed Dec. 30, 1938 5 Sheets-Sheet 3
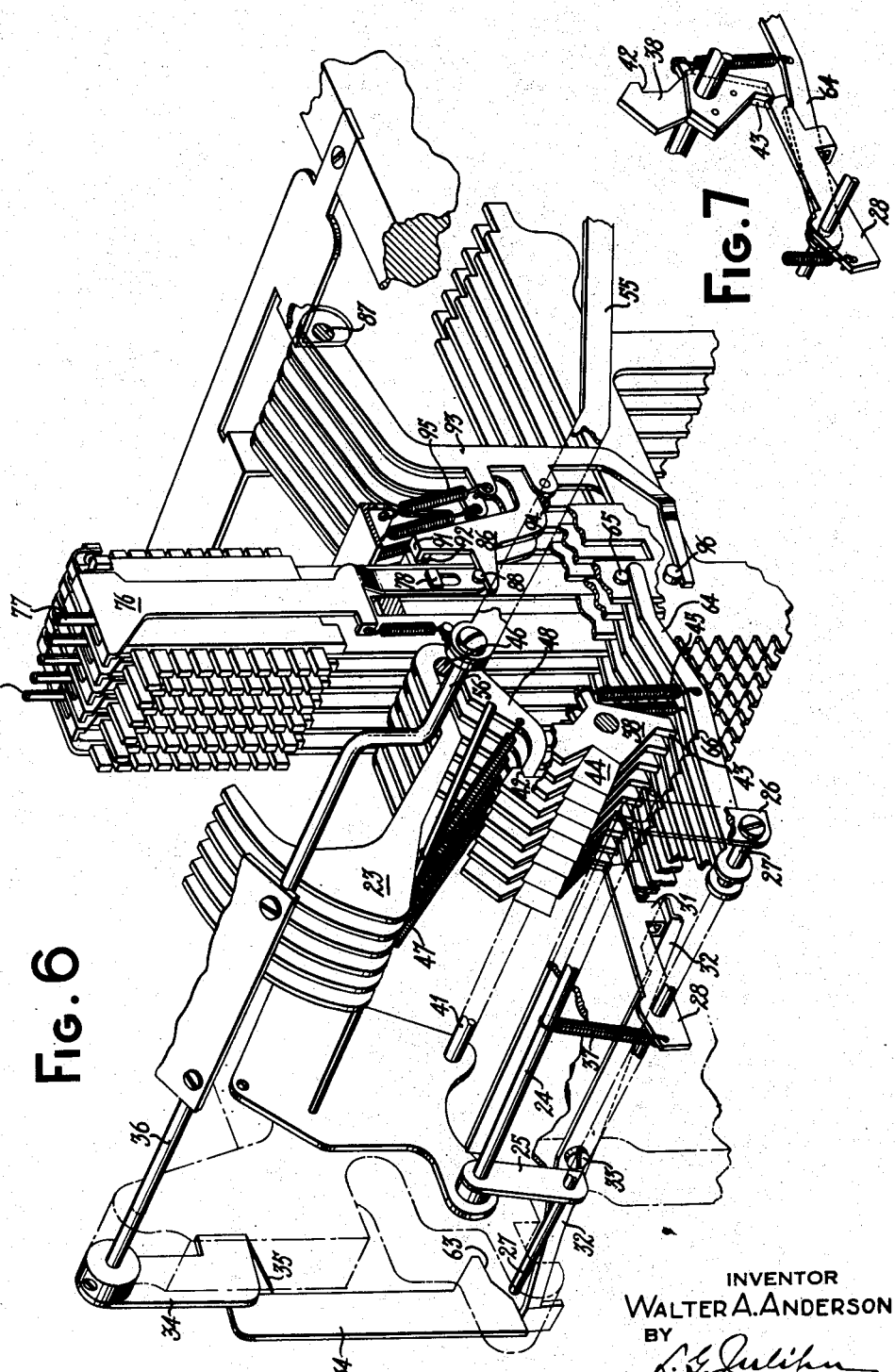
INVENTOR
WALTER A. ANDERSON
BY
ATTORNEY Feb. 3, 1942. W. A. ANDERSON 2,272,079
PRINTING MECHANISM FOR ACCOUNTING MACHINES
Filed Dec. 30, 1938 5 Sheets-Sheet 4
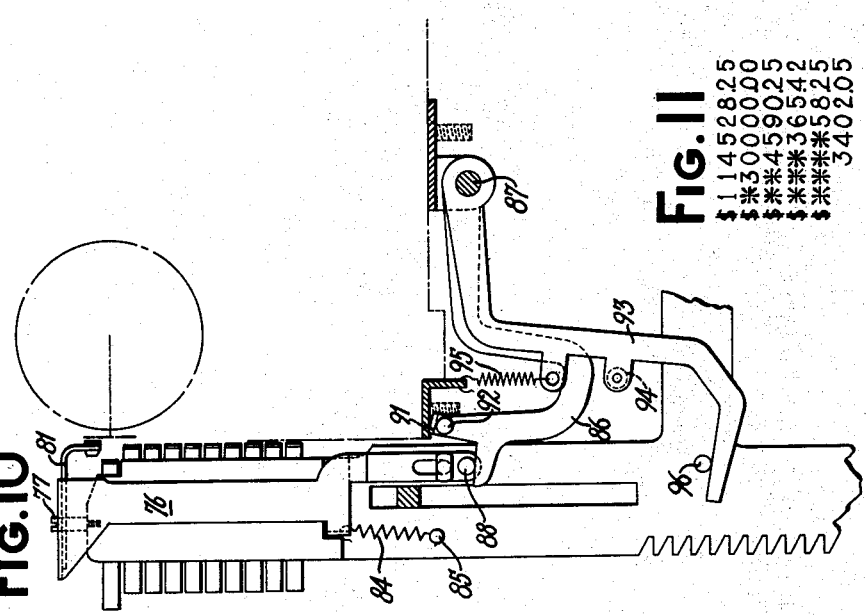
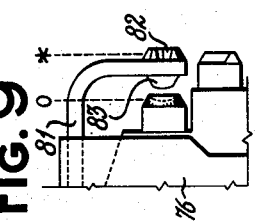
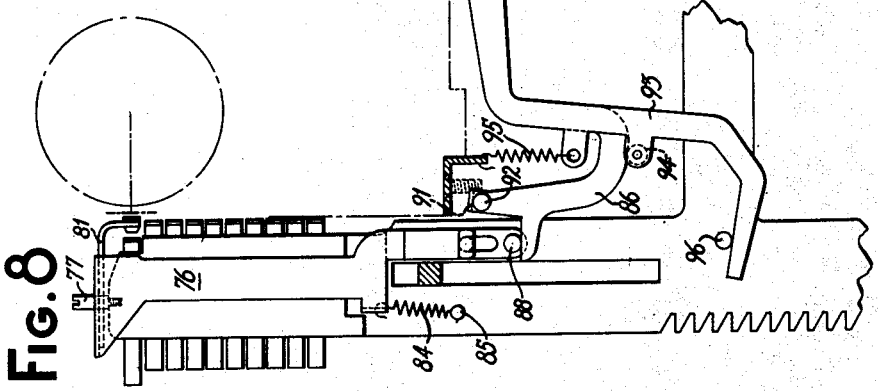
INVENTOR
WALTER A. ANDERSON
BY
ATTORNEY Feb. 3, 1942.  W. A. ANDERSON  2,272,079
PRINTING MECHANISM FOR ACCOUNTING MACHINES
Filed Dec. 30, 1938   5 Sheets-Sheet 5

INVENTOR
WALTER A. ANDERSON
BY
ATTORNEY

Patented Feb. 3, 1942

2,272,079

UNITED STATES PATENT OFFICE 2,272,079

PRINTING MECHANISM FOR ACCOUNTING MACHINES

Walter A. Anderson, Bridgeport, Conn., assignor to Underwood Elliott Fisher Company, New York, N. Y., a corporation of Delaware Application December 30, 1938, Serial No. 248,429

7 Claims. (Cl. 101—93)

This invention relates to printing mechanism for accounting machines, and more particularly to those that are used to print amounts on bank checks.

In printing amounts upon bank checks it is desirable to "protect" the check by having some sort of characters or mutilations immediately to the left of the printed amount so that persons handling the check will not be able to insert additional numerals at the left for the purpose of giving the check a higher apparent value. The check may be protected in a number of ways such as mutilating the necessary portion of the check after the amount is printed, or printing on the check the necessary characters to the left of the amount, either before or after the amount is printed by the accounting machine. These methods require additional handling of the checks, and are for this reason objectionable.

It is therefore an object of the present invention to provide the necessary protection by printing characters to the left of the printed amount by the printing mechanism of the accounting machine at the time the amount is printed.

It is a further object of the invention to prevent the printing of these characters during operations of the machine in which the number printed is not to appear on a check.

With these and incidental objects in view, the invention consists in certain novel features of construction and combinations of parts, the essential elements of which are set forth in appended claims, and a preferred embodiment of which is hereinafter described with reference to the drawings which accompany and form part of the specification.

Figure 2:
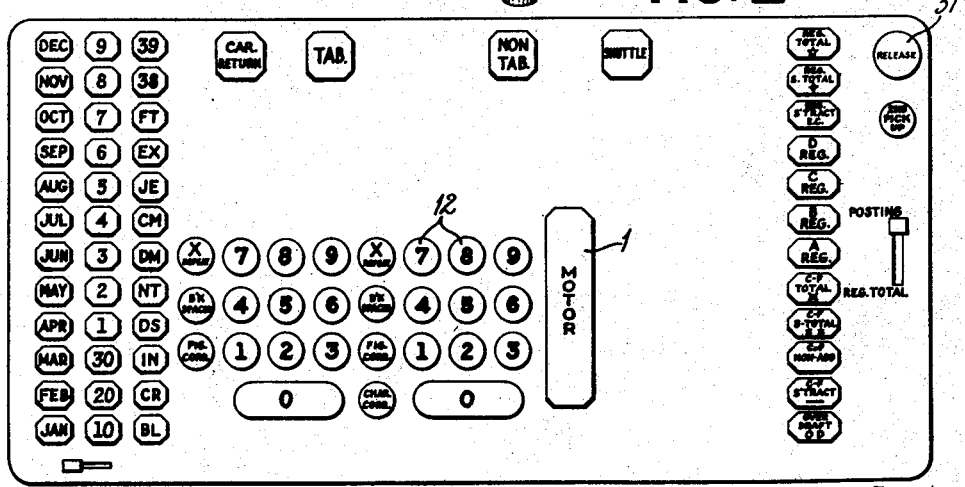
Figure 12:
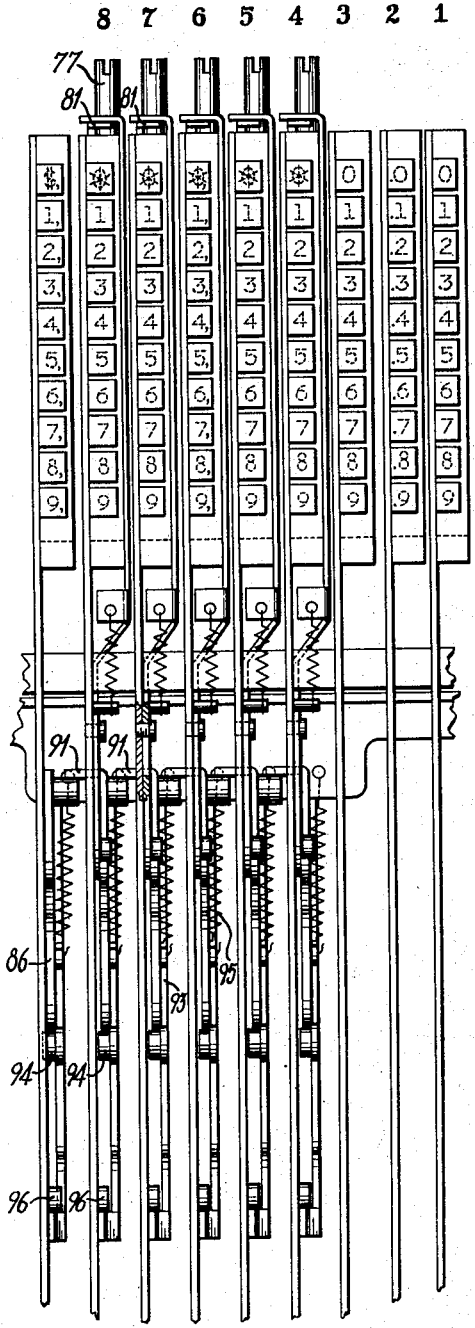
Figure 13:
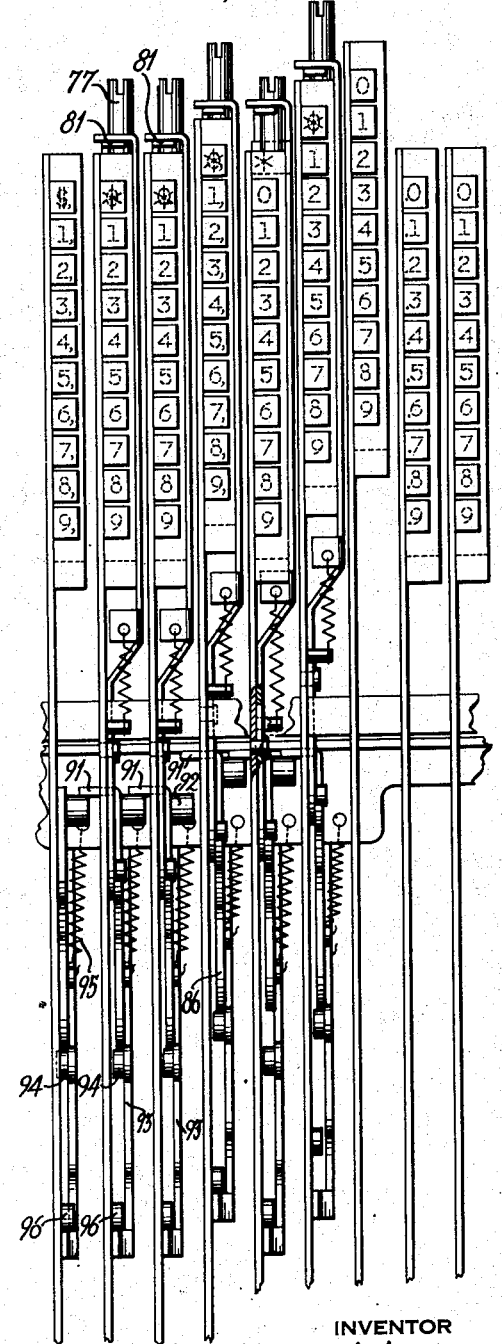

In the drawings:

Figure 1 is a perspective view of an accounting machine embodying the present invention, Figure 2 is a diagrammatic view of the keyboard, Figure 3 is a right side elevation of parts of the actuating mechanism of the machine and of the mechanism for controlling operation of the present invention by a traveling paper carriage, Figure 4 is a detail view of parts of the mechanism for preventing printing of the characters, Figure 5 is a detail rear view of parts of the mechanism for preventing printing of the characters, Figure 6 is a perspective view of the printing mechanism, showing the mechanism for printing characters to the left of an amount and also showing parts of the mechanism for preventing printing of the characters, Figure 7 is a detail view of parts shown in Figure 6, Figures 8, 9 and 10 are right side elevations of details of the parts used to allow zeros instead of characters to be printed where necessary to the right of the highest digit in an amount, Figure 11 shows the appearance of various amounts printed by the machine, and Figures 12 and 13 are front elevational views showing the type bars as they appear from the front of the machine and showing, in dotted lines, the numerals and characters appearing on the rear face of the type, Figure 13 showing the position of the type bars for printing the amount shown above the type bars.

1. *Printing mechanism in general*

The present invention is shown applied to a machine similar to the one disclosed in United States Patent No. 2,194,270 to Oscar J. Sundstrand.

The machine is operated by an electric motor (not shown) under control of a motor bar 1, or under the control of a traveling paper carriage 2, in the manner disclosed in said patent. Printing is accomplished by type carried on type bars 3 (Figure 3) that are supported for vertical movement in the machine. The type bars are operated by springs 5, through levers 6 pivoted at 7 and connected at 8 with the lower ends of the type bars. The extent of vertical movement of the type bars is controlled by pins 11 that are moved by amount keys 12 into the path of vertically disposed rods 13 connected to the forward ends of arms 14 of type bars 3. The type bars move up and down under control of two similar arms such as 15 pivoted at 7 and being situated on opposite sides of the type bars. A rod 16 extends between the arms 15 and lies in contact with the upper edges of levers 6. Two similar arms 17, only one of which is shown, are secured to drive shaft 18 and are each provided with a roller such as 21, resting in a cam slot in the forward end of its respective arm 15.

Operation of the machine causes drive shaft 18 to rotate counter-clockwise, then clockwise, during each cycle. This movement raises and lowers arms 15, allowing springs 5 to move levers 6 above their pivots 7 and raise the type bars differentially under control of pins 11.

As shown in Figure 3, rods 13, and consequently the corresponding type bars, for those decimal orders in which no amount key was operated, are held in their zero position by a plate 22. The details of this mechanism are fully disclosed in the above mentioned patent.

It will be noted that the type bars all lie normally in a position where their uppermost type lies one step below the printing point, so that during the first part of a machine cycle all the type bars must rise one step before their uppermost type are in position to print.

When drive shaft 18 completes its counter-clockwise movement, type bars 3 have all risen to their fullest extents as determined by the amount indexed on the keyboard. Shortly thereafter hammers 23 are tripped and strike the type to effect the impression. Shaft 18 then returns the type bars to their original position.

2. *Normal tripping of the hammers*

Referring to Figure 6, a shaft 24 is journaled in the machine frame and is provided with two depending arms 25 and 26. A rod 27 passes through the lower ends of arms 25 and 26 and extends a short distance to the left of arm 25. A connection, shown in the above mentioned patent, between drive shaft 18 and the left end of rod 27, moves rod 27 and arms 25 and 26 a short distance counter-clockwise about shaft 24. A lever 28 is pivoted on rod 27 and has a downwardly extending portion 31 that rests on the overturned right hand end of a lever 32 pivoted at 33 on the machine frame. The overturned portion of lever 32 is of sufficient width to support the portion 31 of lever 28 during its movement to the right when rod 27 is operated. The left end of lever 32 lies under the lower end of an arm 34 that has an offset portion 35, and which is secured to a shaft 36 journaled in the frame at both sides of the machine. A spring 37 is connected to shaft 24 and to the left end of lever 28 to tension the lever clockwise about rod 27. Such movement of the lever, however, is normally prevented by the left end of lever 32 resting against the lower end of arm 34.

A series of latches 38 are journaled on a rod 41 supported in the machine frame. These latches are each provided with a notch 42 in its upper portion and a shoulder 43 on its lower portion. Each of the latches except the one at the extreme left is provided with an offset flange 44 that extends in the path of oscillation of the adjacent latch to the left. By these flanges, oscillation counter-clockwise of any latch 38 is effective to operate all the latches to the right, the latches to the right corresponding to the lower decimal orders. A spring 45 is provided for each latch 38 to tension the latches clockwise about rod 41.

Printing hammers 23 are pivoted on a rod 46 supported in the machine frame, and are each provided with a spring 47 to drive them clockwise about rod 46 to effect printing. Hammers 23 are provided with lower arms 48, the left end of the arms being normally engaged by notches 42 in latches 38.

The right hand end of lever 28 lies in line with the shoulder of the extreme left latch 38, so that the above described movement of lever 28 to the right oscillates the left latch 38 counter-clockwise. This trips the left printing hammer 23 and, because of the offset flanges 44, trips the other hammers as well. In this way printing is effected in all the denominational orders during each normal cycle of the machine.

3. *Temporarily preventing printing to the left of an amount*

To prevent printing to the left of an amount, as is desirable when the printing is to be done on forms such as statement or journal sheets, the following mechanism is provided.

Referring to Figures 3 and 4, a depressible release key 51 is provided on the keyboard, and is connected to a lever 52 pivoted at 53 and provided with an offset arm 54. A link 55 is connected to a crank portion 56 on the right hand end (Figure 6) of shaft 36. The lower end of link 55 rests on a horizontal portion 57 of a lever 58 pivoted at 61. Depression of the release key 58 moves arm 54 about 53 as a pivot, causing it to strike a pin 62 on link 55 and move the link to the left (Figure 3). This rotates shaft 36 (Figure 6) clockwise and moves the lower end of arm 34 to the left sufficiently to bring a step 63 above the left end (Figure 6) of lever 32. Step 63 is a sufficient distance above the lower end of arm 34 to allow spring 37 to lower the right hand end of lever 28 to a position where it is too low to strike shoulder 43 on the left hand latch 38 when lever 28 is moved to the right during the cycle.

With lever 28 disabled, it is necessary to provide a means that will trip the hammers corresponding to the digits of the amount indexed on the keyboard. To do this, a means similar to that disclosed in the above mentioned patent is provided.

This means includes a series of arms 64, one for each type bar. These arms are pivoted on rod 27 and are tensioned upwardly, by springs 45, against studs 65 on the type bars. When a type bar rises two or more steps, that is, to its position for printing the numeral "1" or a higher numeral, its associated arm 64 rises sufficiently to engage a shoulder 66 with shoulder 43 on its corresponding latch 38. Subsequent movement of rod 27 to the right during the cycle is then effective to rotate the latch 38 and trip the hammer. Due to the offset flanges 44, the tripping of any latch effects tripping of the remaining latches to the right so that if the amount set up on the keyboard contains zeros, they are printed. It will be observed from Figure 7 that shoulder 43 on the left hand latch 38 is made sufficiently broad to accommodate its arm 64 as well as lever 28.

The function of the release key may also be performed automatically, under control of the traveling carriage 2. This means includes one or more magazines 67 (Figures 3 and 5) secured to the traveling carriage and carrying a lug 68 lying in line with a roller 71 carried by a lever 72 pivoted at 73. As the carriage moves into a columnar position in which it is desired that the above described mechanism shall operate to prevent the printing of symbols, lug 68 depresses roller 71 and lever 72. This lowers a rod 74 resting on the horizontal arm of lever 58 and rotates the lever, moving link 55 to the left and rotating shaft 36 (Figure 6) in the same manner as if the release key had been depressed.

Shaft 36, link 55 and the associated parts are restored to normal position by a spring 75 (Figures 3 and 4).

4. *Substitution of zeros for characters to the right of the digit of highest order in an amount*

Referring to Figure 11, it is seen that characters in the form of asterisks are printed to the left of the digit of highest order in printed amounts, and, referring to Figure 9, it is seen that these characters are printed by having the character type situated between the zero type and the platen. Since characters are normally printed in the 4th, 5th, 6th, 7th and 8th decimal orders, when the type bars in these decimal orders do not rise above the zero positions, it is necessary to provide a means to substitute zeros for the characters in the decimal orders where zeros appear in the amount to be printed. An example of this appears on the second line in Figure 11.

The following mechanism is therefore provided to effect this substitution. A bracket 76 (Figure 6) is supported on each of the type bars in the 4th, 5th, 6th, 7th and 8th decimal orders. These brackets have their upper edges bent over to rest on top of the type bars, the bent-over portions having slots embracing screws 77 secured in the upper ends of the type bars. The lower ends of brackets 76 also are slotted to receive headed studs such as 78 secured in the type bars. By this connection, brackets 76 may be moved vertically on the type bars a limited extent, and the upper ends of the brackets may be moved toward the platen.

An arm 81 (Figures 8, 9 and 12) is secured to the upper end of each bracket 76 and is bent downwardly to lie between the zero type and the platen, the lower end of the arm being provided with an asterisk type 82 and a boss 83. A spring 84 is connected to each bracket 76 and to a stud 85 on each type bar. The tension of these springs normally holds brackets 76 in their lower position and away from the platen.

By this construction, when the type bars are raised one step from their lowermost positions illustrated in Figure 12, the asterisk type 82 is brought to the printing point, as illustrated in Figure 8. Tripping of the hammers with the type in this position causes the zero type to strike boss 83 and carry the asterisk type 82, together with brackets 76, forward, the type 82 printing an asterisk on the paper. When the hammers are withdrawn, the individual type springs, disclosed in the above mentioned patent, return the zero type to the position shown in Figure 8, while spring 84 returns type 82 and brackets 76 to their initial position shown in Figure 8.

To lift type 82 out of the path of the zero type, the following parts are provided. A series of levers 86 (Figure 8), one for each bracket 76, are pivoted on a rod 87 and have their left ends lying under studs 88 on brackets 76. Each lever 86 is provided with an overturned flange 91 (Figures 8 and 13) and a stud 92, the studs each lying under the flange 91 of lever 86 in the next lower denominational order. A series of levers 93, one for each lever 86, also are pivoted on rod 87. Each lever 93 has a roller 94 (Figures 8 and 13) supporting its corresponding lever 86. A spring 95 is connected to each lever 93 and to the machine frame to tension the levers clockwise about rod 87, their clockwise movement being limited by studs 96 on the type bars.

By these parts, movement of a type bar from its lowermost position shown in Figure 12 to its character (or zero) printing position shown in Figure 8, permits spring 95 to raise levers 93 and 86 one step, to the position shown in Figure 8, all the levers 86 and 93 moving uniformly the same extent.

As soon as any one of the type bars in the 4th to 8th decimal orders rises one step farther, its lever 93 and lever 86 rise one step above their positions shown in this figure. For the purpose of illustration, we will consider that only the type bar in the 7th decimal order rises during this operation. In this instance, stud 92 in the 7th order, through its contact with flange 91 in the 6th order, lifts lever 86 in the 6th order, flanges 91 and studs 92 causing levers 86 in also the 5th and 4th decimal orders to be raised. Since the type bars in the 4th, 5th and 6th decimal orders remain in their character (or zero) position illustrated in Figure 8, while their associated levers 86 are raised one step above the position shown in Figure 8, that is, to the position shown in Figure 10, brackets 76 associated with these type bars are raised to their position shown in Figure 10 where type 82 is above the path of the zero type.

It will be noted that each of the springs 95 is sufficiently strong to raise all the levers 86 and brackets 76 of lower orders.

With the character types 82 in the 4th, 5th and 6th positions above their associated zero type, release of the hammers causes zeros to be printed in these orders, so that the printing will appear as illustrated on the second line in Figure 11. When the type bars are restored during the latter part of the cycle, levers 86 and 93 and brackets 76 are restored to their initial positions under control of studs 96.

Figure 11 illustrates the appearance of different printed amounts, the bottom line illustrating the appearance of an amount printed with the release key 51 depressed.

To properly align the character type 82 for printing, and to prevent mutilation of the face of the zero type, boss 83 conforms in shape to the cavity in the face of the zero type, and is of sufficient thickness to prevent the face of the type from striking arm 81.

While the form of mechanism herein shown and described is admirably adapted to fulfill the objects primarily stated, it is to be understood that it is not intended to confine the invention to the one form of embodiment herein disclosed, for it is susceptible of embodiment in various forms all coming within the scope of the claims which follow.

What is claimed is:

1. In a machine of the class described, a plurality of type supports each carrying a zero type, an auxiliary type support associated with each first mentioned support and being movable while the first mentioned support is at rest, the auxiliary supports carrying character type and means controlled by one of said first mentioned supports for moving a plurality of said second mentioned supports to move the character type out of printing position.

2. In a machine of the class described, a platen, a plurality of type supports, numeral type slidably supported therein for individual movement toward the platen for printing, an auxiliary type support associated with each first mentioned support and being loosely mounted on the first mentioned support for movement toward the platen while the first mentioned support is at rest, a character type on the auxiliary support and being movable by the auxiliary support into and out of printing position, and means controlled by one of said first mentioned supports for moving a plurality of said character type out of printing position.

3. In a machine of the class described, reciprocatory type bars, numeral type slidably mounted thereon, printing hammers for striking the numeral type individually, character type supported by the type bars and situated, during an operation, at the printing line in the decimal orders where a zero is desired in an amount to be printed, and means, controlled by a type bar of higher order, to move the character type away from the printing point before printing is effected by the hammers.

4. In a machine of the class described, a type support, type thereon, a platen, an auxiliary type supported between the first mentioned type and the platen, and means for removing the auxiliary type from its position between the first mentioned type and the platen during a machine operation.

5. In a machine of the class described, a platen, a plurality of type bars carrying type, means to move the type toward the platen to effect printing, and means controlled by one bar to move one of the type on another bar into and out of the path of movement of another type on the same bar.

6. In a machine of the class described, a platen, a type support, a type thereon, an auxiliary type situated between the first mentioned type and the platen, a support for said auxiliary type mounted on the first mentioned support and having limited movement relative thereto, and means to move the auxiliary type away from the first mentioned type through movement of the auxiliary type support.

7. In a machine of the class described, a platen, a type support, a type thereon, an auxiliary type support, a type thereon normally situated between the first mentioned type and the platen, an adjustable connection between the auxiliary support and the first mentioned support, the amount of adjustment provided being sufficient to accommodate movement of the auxiliary type from between the first mentioned type and the platen, and means to so move the auxiliary type.

WALTER A. ANDERSON.